XR 3,271,704

X 84213

Sept. 6, 1966 3,271,704

ULTRASONIC DELAY DEVICE

Filed March 25, 1963 2 Sheets-Sheet 1

INVENTOR
A. H. FITCH
BY Ray M. Porter Jr.
ATTORNEY

3271704
OR IN 333/30R

United States Patent Office
3,271,704
Patented Sept. 6, 1966

3,271,704
ULTRASONIC DELAY DEVICE

Arthur H. Fitch, Mountain Lakes, N.J., assignor to Bell Telephone Laboratories, Incorporated, New York, N.Y., a corporation of New York Filed Mar. 25, 1963, Ser. No. 267,714
6 Claims. (Cl. 333—30)

This invention relates to delay devices and more particularly to ultrasonic delay lines having special delay versus frequency characteristics.

Dispersive delay lines, that is, those having a delay that varies according to some function with frequency are well known and their usefulness in numerous applications is recognized. Typical of this form is the strip delay line using the first longitudinal mode of propagation which may be designed to produce a delay characteristic that increases in an approximate linear relationship with frequency over a given band.

There is also a need for delay lines having a frequency characteristic that decreases with increasing frequency. For example, in certain signal transmission systems an intelligence signal is first dispersed, that is, the frequency components are delayed in time relative to each other according to some relationship that varies with frequency, and after certain operations are performed by or upon this signal, it must be returned to its original time relationship or collapsed. This disperse-collapse operation requires pairs of dispersive lines having "image" delay characteristics such that over the operating frequency band the sum of the delay of the two lines is constant. When the desired delay characteristic is linear with frequency there are satisfactory techniques for inverting the components of the signal in the frequency spectrum after they have been dispersed by a given line and then applying them to an identical line to be collapsed. However, if the desired delay characteristic is nonlinear, inversion does not produce an image. For example, a delay characteristic of negative curvature with positive slope decreasing with increasing frequency when inverted is of negative curvature with negative slope decreasing with increasing frequency whereas the desired complementary or image characteristic should be one of positive curvature with negative slope increasing with increasing frequency. This will be demonstrated further hereinafter. Thus, in addition to the usual increasing delay versus frequency characteristic either linear or nonlinear, a complementary decreasing delay versus frequency characteristic is required that may be either linear or nonlinear.

It is therefore a specific object of the invention to delay ultrasonic signals according to a dispersive delay characteristic that decreases with increasing frequency.

While a primary usefulness of the present invention appears to reside in filling the need for the above-described delay versus frequency characteristic, it should be noted that the characteristic obtainable by the techniques and structures to be described can produce a delay of substantially any characteristic including ones decreasing, constant or increasing with frequency.

Therefore, it is a broader object of the invention to delay ultrasonic signals according to a desired delay versus frequency characteristic.

Applicant has recognized that the second longitudinal mode of propagation has a delay versus frequency characteristic that decreases with increasing frequency in one range and is substantially independent of frequency in a different range. This mode, however, is not the principal or dominant longitudinal mode, and in the past efforts have been made to eliminate the presence of this mode along with other spurious signals. Furthermore, the second longitudinal mode, unlike the first mode, has a cut-off frequency which depends upon the relationship of its wave length to the physical thickness of the strip line. This fact is utilized in accordance with the invention to separate the first and second longitudinal modes in order to utilize the useful characteristics of the latter. Thus, a thickness dimension change or its equivalent is provided along the length of an ultrasonic delay medium to divide it into two portions. A conventional thickness-longitudinal mode transducer excites both the first and second longitudinal modes in the first portion of the line which has a thickness dimension sufficient to support both modes. The dimension of the other portion is, however, small enough that the second mode is cut-off, is reflected at the discontinuity and returns to the input transducer. The first longitudinal mode continues into the second portion and is there dissipated by suitable damping means.

These and other objects, the nature of the present invention, its various features and advantages will appear more fully upon consideration of the various illustrative embodiments now to be described in detail in connection with the accompanying drawings, in which.

Figures 1, 3, 5:
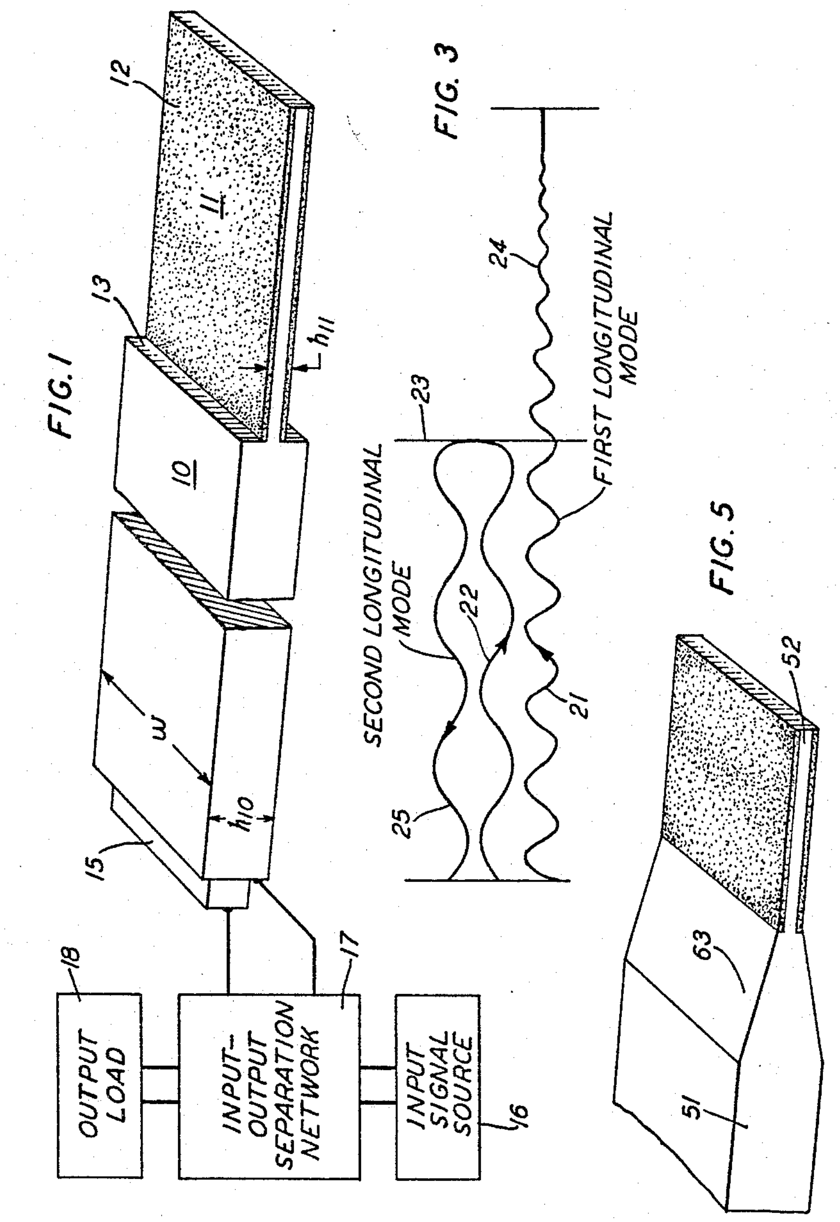
FIG. 1 is a showing, partly in schematic and partly in perspective, of a single-ended, two-section dispersive delay line in accordance with the invention.
FIG. 3 is a schematic showing of propagation paths of different modes in the embodiment of FIG. 1.
FIG. 5 is a fragmentary view of an alternative construction of a portion of the structure of FIG. 1.

Referring more particularly to FIG. 1, there is shown a delay medium having two successive portions 10 and 11. Each portion is in the form of a strip having parallel major surfaces spaced apart by a small thickness dimension equal to $h_{10}$ in section 10 and a smaller $h_{11}$ in section 11. Parallel minor surfaces are spaced apart by a width dimension $w$ that is large compared to either $h_{10}$ or $h_{11}$. The portions are arranged successively with one end of section 10 connected rigidly to an end of section 11 in coaxial relationship with each other so that a step or discontinuity 13 is formed at their junction. Ideally, both sections 10 and 11 should be integrally formed from an isotropic material such as glass or vitreous silica, but polycrystalline materials such as metallic alloys have proven satisfactory provided grain size is sufficiently small compared to the wave length of the elastic wave carried by the strip.

Absorber material 12 is deposited upon at least the major surfaces of portion 11 and also desirably upon at least a portion of the minor surfaces thereof. This absorber material may comprise an adhesive tape having a cloth or plastic type backing and should be of sufficient length to absorb elastic wave energy, and therefore, to eventually attenuate or damp any wave propagating along section 11.

Means are provided at the free end of the thicker section 10 for coupling an electrical input signal with an ultrasonic wave in section 10 and, in turn, for coupling an ultrasonic wave to an electrical output load. As illustrated, the source of input signals is represented by 16 and the output load by 18. These circuits are coupled together by any suitable separation network 17 which is capable of discriminating between the input and the output signals. For example, if the input is a source of pulses, network 17 can be a simple gating circuit which discriminates on the basis of time. On the other hand, network 17 may be one of any of the various forms of circulators which discriminate on the basis of direction of propagation. Network 17 is, in turn, coupled to a conventional piezoelectric ceramic transducer 15 in the form of a rectangular bar bonded to one end face of strip 10 using standard techniques. Transducer 15 is poled in the thickness direction, provided with electrodes, and suitably bonded to section 10 with the poling direction parallel to the length of the strip so as to produce and respond to vibrations in a thickness-longitudinal mode. Accordingly, when the transducer is excited by an alternating voltage, such as a pulse of wave energy applied from network 17 connected to the electrodes, a thickness-longitudinal mode of vibration is induced therein. Conversely, an elastic wave motion in the strip generates an electrical sigal that is delivered by network 17 to load 18.

A particular feature of the present invention resides in the relative thickness dimension of sections 10 and 11. Specifically, the thickness dimension $h_{10}$ of section 10 is greater, and the thickness dimension $h_{11}$ of section 11 is less, than a value $h_{co}$, where $h_{co}$ corresponds to the cut-off thickness for the second longitudinal mode in a strip line for the highest frequency in the band of interest. The dimension $h_{co}$ is very roughly equal to one-half wavelength of the second longitudinal mode in the particular material for the frequency referred to as the cut-off frequency. In this respect, ultrasonic cut-off is closely analogous to the cut-off condition of electromagnetic wave energy in conductively-bounded waveguides. For a given thickness, frequencies less than the cut-off frequency will not support free propagation of the second longitudinal mode in the structure. Similarly, for a given frequency the second longitudinal mode cannot freely propagate in a structure having a thickness less than the cut-off thickness. A more accurate definition of cut-off depends upon very complicated transcendental equations of wave motion, extensive treatment of which may be found in the literature. More helpful in the present connection is the analysis "The Application of the Theory of Elastic Waves in Plates to the Design of Ultrasonic Dispersive Delay Lines," by T. R. Meeker, appearing in the I.R.E. International Conventional Record, 1961, volume 9, part 6, pages 327–333.

As may be seen from this reference, the starting point for a discussion of cut-off is the equation which governs all mechanical wave phenomena in solids, namely, the elastic wave equation, a second order partial differential equation. In order to describe the possible wave motions in a strip, one assumes the existence of traveling wave solutions. Substitution of these traveling wave solutions in the elastic wave equation and imposition of the boundary conditions yields a set of homogeneous linear equations. A necessary and sufficient condition for the existence of a solution to these equations is that the determinant of the coefficients vanish identically. Since the determinant or the coefficients of these homogeneous equations can be written as the product of four subdeterminants the condition for the existence of a solution is satisfied when any one of the four subdeterminants is zero. The equation formed by setting any one of four subdeterminants to zero is called a frequency equation, and each of these four frequency equations is related to an independent set of displacement components. One such frequency equation relates to what is called the longitudinal family of modes. If the elastic properties of the material are specified in terms of $V_s$, the free space shear wave velocity, which is a function of the shear modulus and the density of the material, and Poisson's ratio $\sigma$, which is a constant for the material, the frequency equation can be regarded as relating three independent variables. In dimensionless form these are an independent variable of frequency $hf/V_s$, an independent variable of propagation constant $\gamma h/2$ and Poisson's ratio $\sigma$ where $h$ is the cut-off thickness, $f$ is the cut-off frequency and $\gamma$ is the propagation constant in the direction of propagation. The solutions of the frequency equations take the form of a series of continuous branches, each branch representing the relationship of $\gamma h/2$ and $hf/V_s$ for a given mode of propagation. In terms of these branches; the dimensionless phase velocity is $$\frac{hf/V_s}{\gamma h/2}$$

and the dimensionless group velocity is $$\frac{d(hf/V_s)}{d(\gamma h/2}$$

The cut-off frequency of a mode is basically associated with the lowest frequency at which free propagation can exist in a mode; it will correspond to a frequency of zero group velocity. On a curve of $hf/V_s$ versus $\gamma h/2$ cut-off corresponds to a minimum in the curve. By solving the frequency equation for say, the second longitudinal mode for various values of Poisson's ratio $\sigma$ the dimensionless cut-off $$\left(\frac{hf}{V_s}\right)_{co}$$

can be tabulated as a function of $\sigma$.

Figure 2:
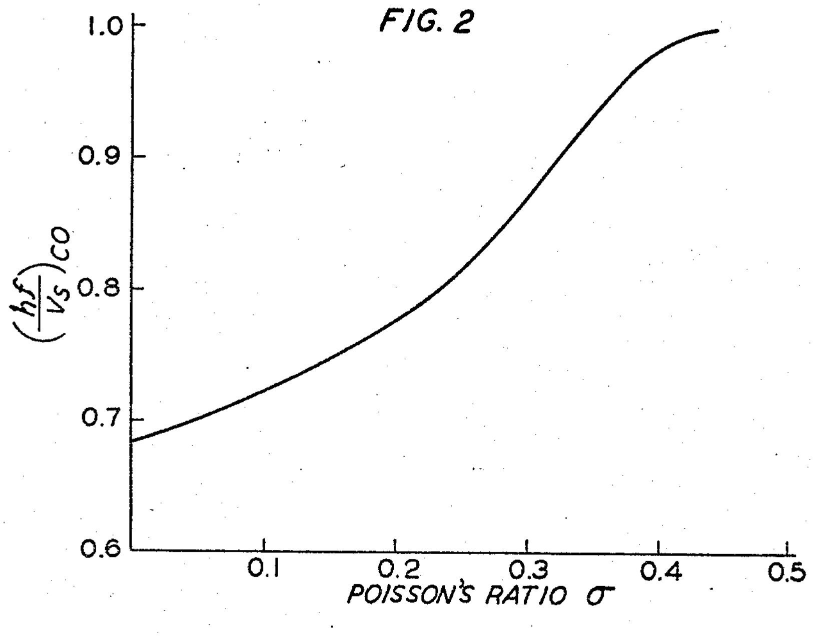
FIG. 2 is a plot of computed results leading to a definition of cut-off in a strip delay line.

Computer-derived solutions of these equations are plotted in FIG. 2 and show the value of the ratio $$\left(\frac{hf}{V_s}\right)_{co}$$

that produces cut-off for various values of Poisson's ratio $\sigma$. Thus, for a typical material such as 5052 aluminum alloy (95 to 97% aluminum, 2% magnesium and 0.2% chromium) which has a Poisson's ratio $\rho$ of 0.35, the dimensionless ratio of cut-off of the second longitudinal mode $$\left(\frac{hf}{V_s}\right)_{co}=0.927$$

from FIG. 2. Since $V_s$ equals 0.1234 inch per microsecond for 5052 aluminum alloy, cut-off occurs for a frequency of 2.17 megacycles when the thickness is .0528 inch. The first longitudinal mode does not experience a cut-off and can theoretically be supported in an arbitrarily thin strip.

The propagation paths of each mode are schematically shown on FIG. 3. Since $h_{10}$ is large enough to support the first longitudinal mode of propagation as well as the second longitudinal mode, both modes will be excited as represented by wavepaths 21 and 22, respectively. The second mode is excited by the direct action of transducer 15 and also as a result of conversion of some first mode energy. The first longitudinal mode propagates through section 10 and into section 11 where it is eventually dissipated as schematically shown at 24. The second longitudinal mode, however, propagates through section 10 until it reaches the discontinuity 23 between sections 10 and 11 whereupon it is completely reflected as shown by path 25 since it cannot enter the restricted dimension $h_{11}$ of section 11. The reflected energy returns to transducer 15 where it is reconverted into electrical energy, delayed from the input signal by twice the delay characteristic of one traversal of section 10, and delivered by network 17 to load 18.

Figure 4:
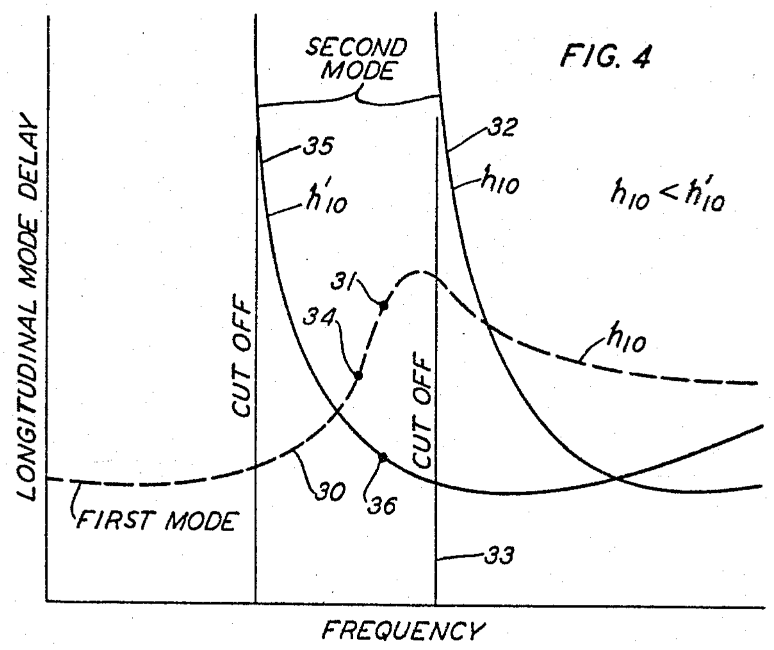
FIG. 4 shows delay versus frequency characteristics typical of the invention and of the prior art.

The nature of this delay characteristic will now be considered. The fundamental or first longitudinal mode of propagation is known to have the general form represented by curve 30 of FIG. 4. See, for example, the article entitled, "Dispersive Ultrasonic Delay Lines Using the First Longitudinal Mode in a Strip," by T. R. Meeker, I.R.E. Transactions on Ultrasonic Engineering, volume UE7, No. 2, June 1960, pages 53 through 58. As indicated by curve 30 little if any dispersion is encountered at the low and high frequencies. Approximate linear dispersive operation is generally centered about an inflection point such as 34 in the center of this range or nonlinear operation is centered about a point such as 31 above the inflection point 34. In contrast to curve 30, curve 32 illustrates a typical delay versus frequency characteristic for the second longitudinal mode. Line 33 represents the cut-off frequency of the second longitudinal mode. At frequencies immediately above cut-off, the delay decreases with frequency according to a nonlinear relationship. At high frequencies the characteristic levels out into a high frequency region far from cut-off of substantially constant delay with frequency. Operation in any of these regions or between them may be selected by controlling the thickness of section 10 relative to the desired operating frequency. This is illustrated by curve 35 which when taken together with curve 32 shows that increasing the thickness of section 10 from $h_{10}$ to $h'_{10}$ lowers the frequency range at which a given portion of the delay versus frequency characteristic appears. Increasing the thickness $h_{10}$ leads to the appearance of the third longitudinal mode which, in the usual application, would be considered an unwanted signal.

Thus, by proper choice of $h_{10}$, therefore, operation in a given frequency band may be obtained about a point which has some desired degree of nonlinearity. For example, point 36 on curve 35 represents a positive curvature with negative slope increasing with increasing frequency that substantially complements the negative curvature with positive slope decreasing with frequency obtained by operation about point 31 of curve 30 for the first longitudinal mode. The fact that the points 31 and 36 represent the center of characteristics that do complement each other may be seen by noting that the sum of their delays at any frequency or either side of these points is very nearly constant. Further and more precise matching of these characteristics may be obtained by the techniques to be described hereinafter.

Further shaping of the characteristic may be obtained as disclosed in detail in my copending application, Serial No. 69,418, filed November 15, 1960, by employing as section 10 a strip whose thickness dimension (always above cut-off) is deliberately tapered or stepped to obtain linear or nonlinear variations in slope, curvature or bandwidth of the delay characteristic. In addition to varying the thickness, other parameters upon which $V_s$ depends, such as the shear modulus or the density of the delay material, or Poisson's ratio may be varied independently or in combination along the length of the strip.

An alternative control of the shape of the characteristic is illustrated in FIG. 5 which takes particular advantage of the transition between sections. In FIG. 1 it was assumed that the thickness transition between sections 10 and 11 was made abruptly from a thickness well above $h_{co}$ to one well below so that all frequency components within the ultrasonic wave are reflected from an identically positioned discontinuity.

Referring to FIG. 5 it will be seen that the transition between input delay section 51 and delay section 52 is made by a gradual taper 63 which extends from the large thickness dimension of section 51, which is greater than cut-off for the lowest frequency in the band of interest, to the smaller thickness dimension of section 52, which is less than cut-off for the highest frequency in the band of interest for the second longitudinal mode. With each frequency component being reflected from the taper at the cut-off point for that particular frequency, it is clear that the high frequency components will penetrate deeper into taper 63 than the low frequency components. Because of this greater depth of penetration, the reflected higher frequency components have a longer round trip path and a corresponding increased delay than the lower frequency components in the band of interest. An infinite number of delay versus frequency characteristics across the band may thus be produced by varying the cut-off frequency of the tapered section at successive points along its length in any desired manner.

The concept of dimension change as employed in the present invention, whether in terms of a step or a taper, relies upon the fact that the delay line has a stepped or tapered cut-off characteristic and not necessarily that the physical dimension of the strip is constricted in size. Inasmuck as cut-off frequency depends upon any of the parameters affecting $V_s$ as set forth above, variation of any one of these parameters constitutes the full equivalent of a physical dimension change. Furthermore, while all discussion has been directed to a strip delay line of rectangular cross-section, it should be understood that the principles may be applied to the second longitudinal mode in a delay line in the form of either a solid or hollow cylinder.

In all cases it is to be understood that the above-described arrangements are merely illustrative of a small number of the many possible applications of the principles of the invention. Numerous and varied other arrangements in accordance with these principles may readily be devised by those skilled in the art without departing from the spirit and scope of the invention.

What is claimed is:

1. In combination, an elongated delay line of ultrasonic transmission material having energy-guiding major surfaces that are spaced from each other to define a relatively small thickness therebetween, a thickness-longitudinal-mode transducer mounted on one end of said line for coupling between electrical signals of a given frequency band applied to said transducer and first and second order longitudinal modes of elastic wave motion in one portion of said line, said thickness in said one portion of said line being greater for all frequencies in said band than the cut-off thickness of the second order one of said longitudinal modes and in another portion of said lines being less than said cut-off thickness, said one portion having a length which is a function of a predetermined delay characteristic unique to said second order longitudinal mode which characteristic is to be introduced to said signals and means associated with said other portion for damping wave motion therein.

2. In combination, an ultrasonic delay line having a parameter that determines the cut-off frequency of the second longitudinal mode of ultrasonic wave propagation therein, means for applying an ultrasonic wave including components of the first and second longitudinal modes to a first portion of said line, said parameter in said first portion determining a cut-off frequency for said second mode therein that is below the lowest frequency component in said wave, said parameter in a second portion of said line determining a cut-off frequency for said second mode therein that is above the highest frequency component in said wave, said first portion having a length which is a function of a predetermined delay characteristic unique to said second longitudinal mode which characteristic is to be introduced to said applied ultrasonic wave, and means coupled to said second portion for damping wave motion therein.

3. The combination of claim 2 including means for coupling with ultrasonic wave energy in said first portion which has been reflected from said second portion.

4. The combination of claim 2 wherein said line is in the form of an elongated strip of rectangular transverse cross-section and wherein said cut-off frequencies of said first and second portions are determined by thicknesses of said first and second portions that are respectively different from each other.

5. The combination according to claim 2 wherein said first and second portions are elongated strips of rectangular transverse cross-section, and wherein the thickness of said portions are $h_1$ and $h_2$, respectively, the shear wave velocities in said portions are $V_1$ and $V_2$, respectively, and said respectively different cut-off frequencies are $f_1$ and $f_2$, and wherein said parameters are in the following ratio:

$$\frac{h_1 f_1}{V_1}=\frac{h_2 f_2}{V_2}$$

6. The combination of claim 2 including a section of tapered cut-off between said first and second portions, said tapered section having a cut-off characteristic that successively reflects frequency components of said wave with a phase delay proportional to the depth of penetration into said taper.

References Cited by the Examiner

UNITED STATES PATENTS

| | | | |
|---|---|---|---|
| 2,485,722 | 10/1949 | Erwin | 333—30 |
| 2,779,191 | 1/1957 | Willard | 73—67 |

| | | | |
|---|---|---|---|
| 2,982,926 | 5/1961 | May | 333—30 |
| 3,041,556 | 6/1962 | Meitzler | 330—30 |
| 3,133,258 | 11/1964 | Meitzler | 333—30 |
| 3,155,926 | 11/1964 | Meitzler | 333—30 |

HERMAN KARL SAALBACH, *Primary Examiner.*

C. BARAFF, *Assistant Examiner.*